(12) United States Patent
Okada

(10) Patent No.: US 7,925,776 B2
(45) Date of Patent: Apr. 12, 2011

(54) WIRELESS COMMUNICATION SYSTEM FOR COMMUNICATION OF AUDIO DATA

(75) Inventor: Koki Okada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 287 days.

(21) Appl. No.: 12/343,834

(22) Filed: Dec. 24, 2008

(65) Prior Publication Data
US 2009/0177738 A1 Jul. 9, 2009

(30) Foreign Application Priority Data
Dec. 27, 2007 (JP) .................. 2007-336404

(51) Int. Cl.
*G06F 13/00* (2006.01)
(52) U.S. Cl. ............... 709/232; 709/231; 709/237
(58) Field of Classification Search .......... 709/217, 709/218, 223, 224, 227, 230, 231, 232, 237
See application file for complete search history.

(56) References Cited

U.S. PATENT DOCUMENTS

| 7,542,719 B2 * | 6/2009 | Takizawa et al. ............ 455/11.1 |
| 2007/0002836 A1 * | 1/2007 | Lindner ........................ 370/352 |
| 2007/0180137 A1 * | 8/2007 | Rajapakse .................... 709/231 |

FOREIGN PATENT DOCUMENTS

JP 2004-328692 11/2004

* cited by examiner

*Primary Examiner* — Viet Vu
(74) *Attorney, Agent, or Firm* — Fish & Richardson P.C.

(57) ABSTRACT

At a client, when first time data received from a server prior to continuous transmission of audio data of the server is set at a second timer, the second timer initiates time-counting from the set first time data. Accordingly, during the subsequent continuous transfer period of audio data, the timers of the server and client are adjusted to output the same time data in synchronization with each other. During the continuous transfer period, the client stores in a memory audio data that has been continuously transmitted according to the sequence to be output via a speaker from the server. The audio data is stored in the received sequence. Unit of audio data whose assigned first time data matches the second time data output from the second timer is searched for among the audio data in the memory to be output via the speaker.

11 Claims, 9 Drawing Sheets

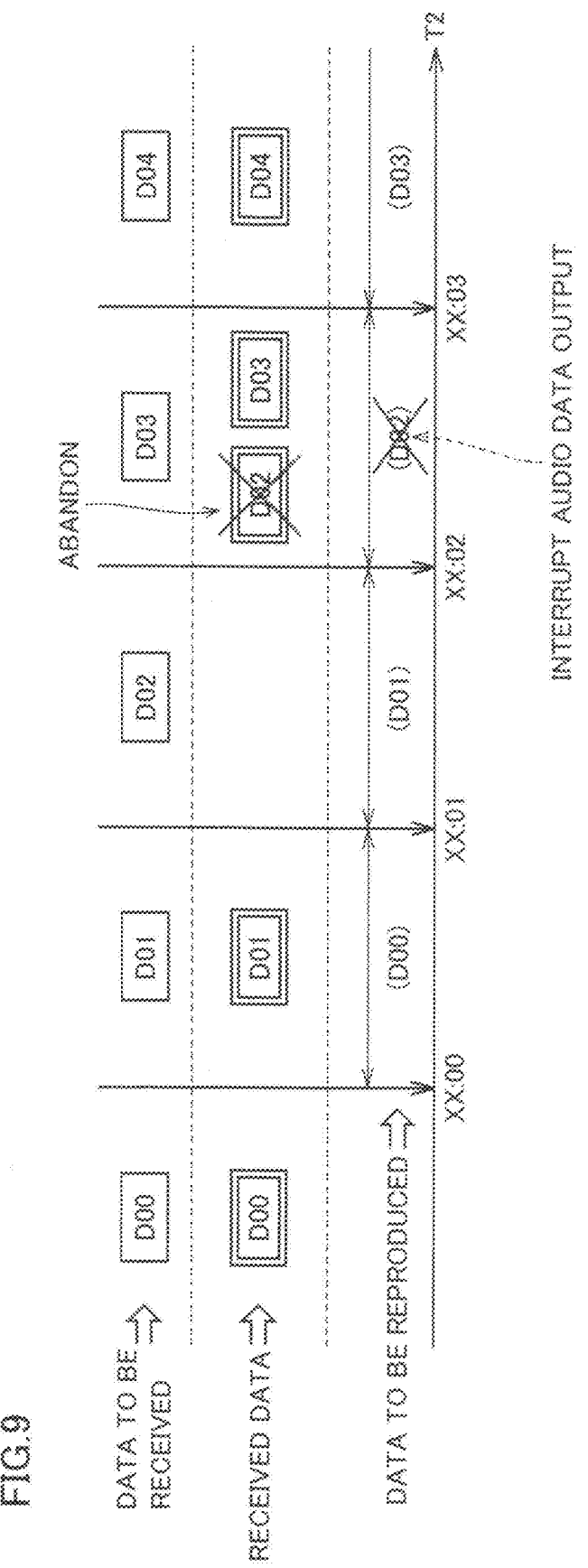

WIRELESS COMMUNICATION SYSTEM FOR COMMUNICATION OF AUDIO DATA

BACKGROUND OF THE INVENTION

1. Field of the Invention

The invention relates to a wireless communication system and particularly to a wireless communication system transferring audio data.

2. Description of the Background Art

In recent years, wireless communications that are performed between a plurality of information communication terminals without using an access point are becoming widely available. The network that is formed of only terminals capable of such wireless communications is called "ad hoc network".

In the wireless communication system using the ad hoc network, the protocol is designed for the file transfer. Therefore, this kind of conventional wireless communication system is not suitable for data transfer such as audio stream reproduction that requires a real-time property in communications.

In the specification, the audio reproduction by the "streaming" is referred to as "audio stream reproduction". The "streaming" indicates a technique which does not employ batch transfer such as conventional file transfer performed by downloading, but is configured to divide data on a sending side, to transfer continuously data items obtained by the division to a receiving side and, at the same time, to reproduce (i.e., output) continuously the data items received on the receiving side.

For example, Japanese Patent Laying-Open No. 2004-328692 has disclosed a conventional structure of a cordless speaker system. According to the publication of Japanese Patent Laying-Open No. 2004-328692, audio data is transferred by wireless communication between an audio amplifier and a speaker.

In the audio stream reproduction using the conventional wireless communication system, when the speaker system on the receiving side does not receive the audio data transmitted from the audio amplifier, such an operation may be performed that the speaker temporarily stops the audio output, and will output it after the speaker receives the audio data with a delay. In this case, a phenomenon such as interruption of the output sound or fluctuations in rhythm occurs to grate on listener's ears.

Although Japanese Patent Laying-Open No. 2004-328692 has disclosed the structure that allows a long-term use of a battery, it has not proposed any structure for avoiding the foregoing phenomenon that may occur when the speaker on the receiving side does not receive data.

SUMMARY OF THE INVENTION

An object of the invention is to provide a wireless communication system that allows reproduction of audio stream with high quality in wireless communications.

For achieving the above object, a wireless communication system according to an aspect of the invention includes a server device, and a client device including an audio output unit and performing wireless communications with the server device.

The server device includes a first timer counting a present time and simultaneously outputting first time data indicating a counted time, an audio data transmitting unit assigning the first time data provided from the first timer to each of unit audio data items obtained by dividing audio data to be transmitted into predetermined units, and continuously transmitting the unit audio data items to be transmitted toward the client device in an order in which the unit audio data items to be transmitted are to be output via the audio output unit, and a time data transmitting unit transmitting the first time data provided from the first timer to the client device.

The client device includes a storage unit, a second timer starting time count according to set time data, and outputting second time data indicating a counted time while performing the time count, an audio data receiving unit successively receiving the unit audio data items transmitted continuously from the audio data transmitting unit, and storing received the unit audio data items in the storage unit, a time setting unit receiving the first time data transmitted from the time data transmitting unit, prior to the continuous transmission of the unit audio data items by the audio data transmitting unit, and setting received the first time data in the second timer, and a searching unit. The search unit searches the unit audio data items stored in the storage unit to retrieve and output successively the unit audio data items having the assigned time data indicating the time indicated by the second time data provided from the second timer. The unit audio data items successively provided from the searching unit are externally output via the audio output unit.

Preferably, the server device and the client device perform wireless communication with each other via a predetermined channel. The client device further includes an acknowledging unit transmitting an acknowledgement to the server device when the audio data receiving unit receives the unit audio data item.

The server device further includes an acknowledgement determining unit determining whether the server device receives the acknowledgement in response to transmission of each of the unit audio data items from the audio data transmitting unit or not, and a channel selection determining unit determining whether a different channel is to be selected as the predetermined channel or not, based on a result of the determination about the acknowledgement by the acknowledgement determining unit.

Preferably, when the different channel is selected as the predetermined channel based on the determination by the channel selection determining unit, the time data transmitting unit transmits information indicating the different channel and the first time data to the client device. The client device selects, as the channel to be used for the wireless communication with the server device, the different channel indicated by the information received from the time data transmitting unit.

Preferably, the server device includes a traffic detecting unit detecting traffic of a plurality of channels for the wireless communication, and selects the different channel from among the plurality of channels based on a result of traffic detection by the traffic detecting unit.

Preferably, the unit audio data item represents a sound of a frequency unperceivable to a human hearing sense.

Preferably, the wireless communication is communication via an ad hoc communication network.

According to the invention, the client device sets the first time data, which was received from the server device prior to the continuous transmission of the unit audio data items, in the second timer. By this setting, the second timer starts the time count according to the first time data set in the second timer. Thereby, during a period for continuously transferring the subsequent unit audio data items, the timers of the server device and the client device are adjusted to output the same time data in synchronization with each other. Therefore, during a period for continuously transferring the subsequent unit audio data items, the client device continuously receives the unit audio data in the order in which the unit audio data items are to be output from the server device via the audio output unit, and stores the received unit audio data items in the storage unit in this order. The unit audio data items in the storage unit are searched for the unit audio data item indicating the same time as that indicated by the second time data provided from the second timer. The unit audio data items obtained by this searching, i.e., the unit audio data items having the first time data indicating the same time as that indicated by the second time data provided from the second timer) are externally output via the audio output unit in the same order as that of the obtaining by the searching.

In the client device, therefore, it is ensured to output the unit audio data items received from the server device via the audio output unit in the order in which the unit audio data items are to be output. Consequently, the audio stream can be reproduced with high quality in the wireless communications.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a timing chart illustrating reception and reproduction of the audio data by the client device.

DESCRIPTION OF THE PREFERRED EMBODIMENTS

This embodiment relates to a structure using an ad hoc network that is a kind of wireless communication network for audio stream reproduction.

Figure 1:
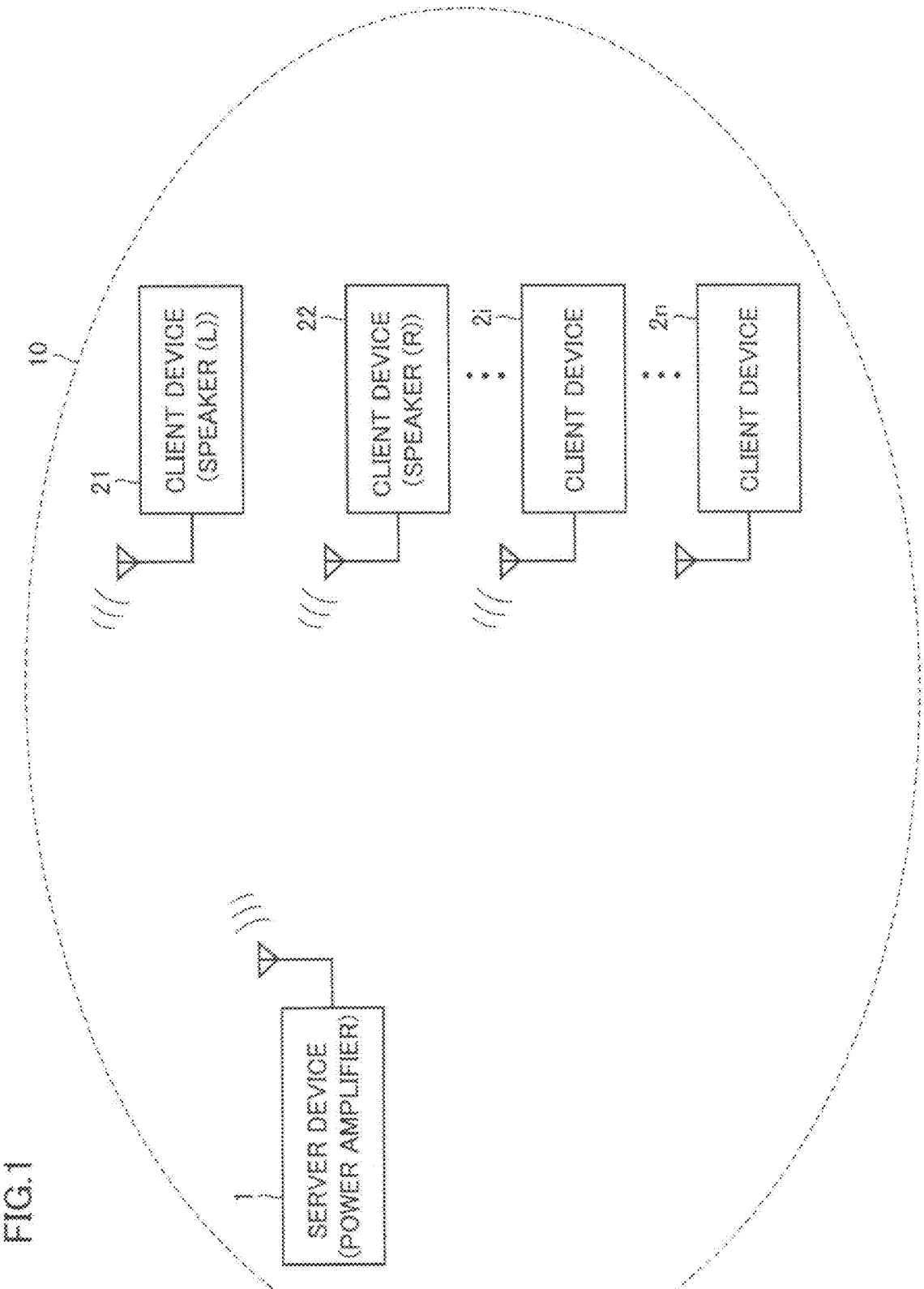
FIG. 1 schematically shows an example of a structure of an ad hoc network that is an embodiment of a wireless communication network of the invention.

FIG. 1 schematically shows an example of a structure of the ad hoc network that is the wireless communication network according to the embodiment.

Referring to FIG. 1, a network 10 includes a server device 1 and a plurality of client devices 2*i* (i=1, 2, . . . , n). Server device 1 has a function as a power amplifier that transmits audio data received from a sound source (not shown) to client devices 2*i*. Client device 2*i* has a function as a speaker that receives the audio data transmitted from server device 1 and externally outputs received the audio data. For example, in the structure in FIG. 1, client devices 21 and 22 operate as L (left) and R (right) speakers, respectively. Although the plurality of client devices 2*i* are employed in FIG. 1, only one client device 2*i* may be employed.

In this embodiment, it is assumed that network 10 is also used by wireless cells (not shown) other than those formed of server device 1 and client devices 2*i* shown in FIG. 1.

The system that uses network 10 in FIG. 1 and is formed of server device 1 and the plurality of client devices 2*i* has a function that ensures an arrival time of audio data at an MAC (Media Access Control) layer level according to the IEEE (Institute of Electrical and Electronics Engineers) 802.11 standard, and thereby implements audio stream reproduction (output) by client devices 2*i* following in real time the audio data transmission from server device 1. More specifically, using a timer value included in a Beacon frame being a kind of management frame that is one of MAC frames periodically exchanged between server device 1 and client device 2*i*, server device 1 performs scheduling of the data transmission, and client device 2*i* adjusts synchronization based on information about time between reception data and reproduction (output) data according to the scheduling.

Figure 2:
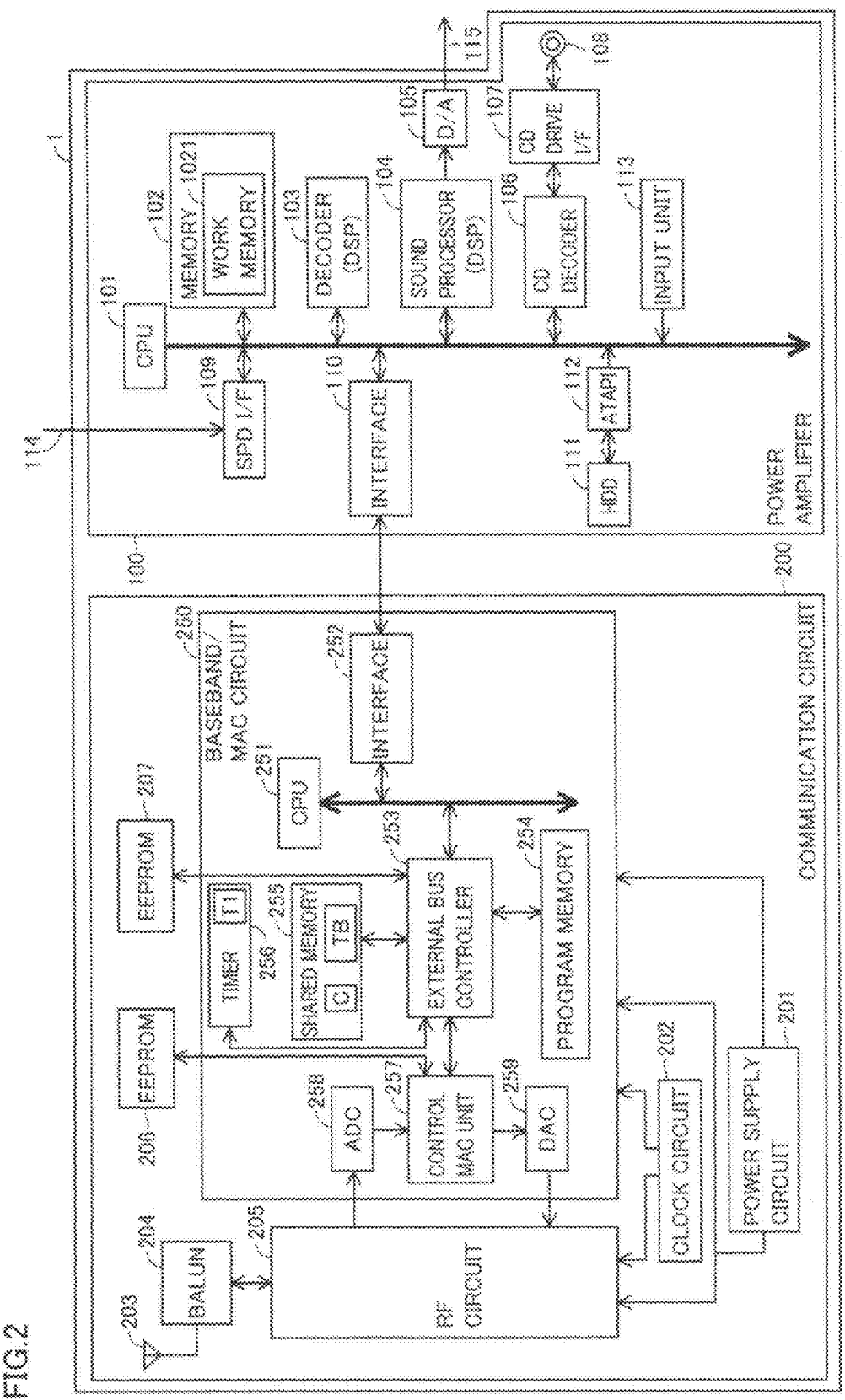
FIG. 2 schematically shows a hardware structure of a server device.
Figure 3:
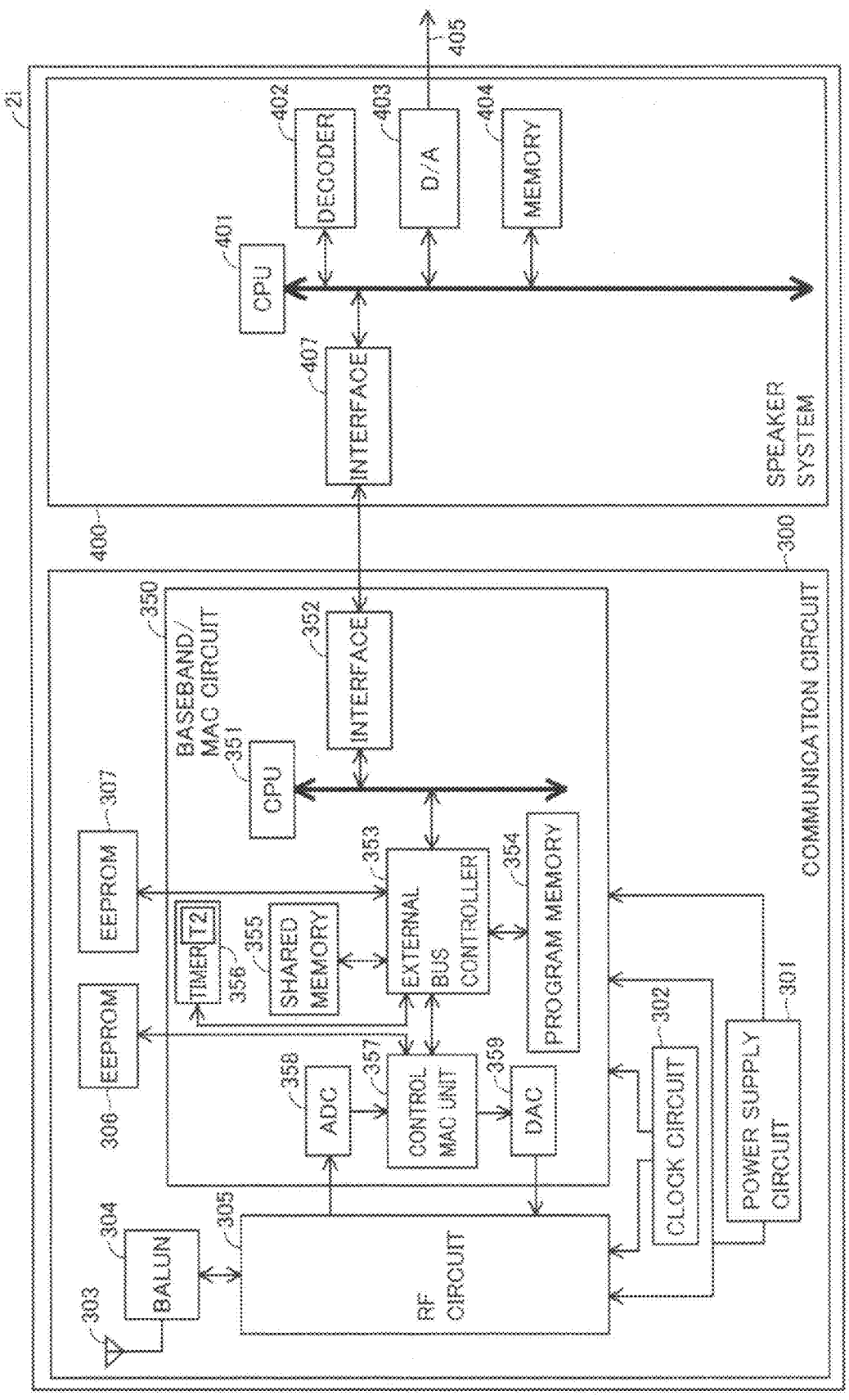
FIG. 3 schematically shows a hardware structure of a client device.

FIGS. 2 and 3 schematically show respective hardware structures of server device 1 and client device 2*i* in FIG. 1.

Referring to FIG. 2, server device 1 is primarily formed of a power amplifier 100 and a communication circuit 200.

Power amplifier 100 includes a CPU (Central Processing Unit) 101 for controlling and managing an overall operation of power amplifier 100. Power amplifier 100 includes a memory 102 for storing various programs and data, a decoder 103 formed of a DSP (Digital Signal Processor), a sound processor 104 formed of a DSP, and a D/A (Digital/Analog) converter 105 that converts digital audio data provided from sound processor 104 and outputs an analog signal 115 obtained by the conversion. Sound processor 104 adjusts a sound pressure of the audio data, and outputs the adjusted audio data to D/A converter 105 and an interface 110.

Power amplifier 100 further includes a CD drive I/F (Interface) 107 for driving a removably loaded CD (Compact Disk) 108 as well as a CD decoder 106.

Further, power amplifier 100 includes an SPD (Serial Presence Detect) I/F 109 accepting an externally provided digital input, interface 110 having an input/output function with respect to communication circuit 200, an HDD (Hard Disk Drive) 111, an ATAPI (AT Attachment Packet Interface) 112 that is an interface for connection of HDD 111 and an input unit 113. ATAPI 112 controls access to data in HDD 111. Input unit 113 accepts instructions that are externally provided, e.g., by a user's operation.

In this embodiment, it is assumed that a sound source for the audio data that are transmitted from server device 1 to client device 2*i* is a digital signal 114 indicating externally provided audio data, audio data reproduced from HDD 111, audio data reproduced from CD 108 or the like, but this is not restrictive. When power amplifier 100 receives the audio data serving as the sound source, it temporarily stores the received audio data in a work memory 1021 of memory 102. CPU 101 divides the audio data in work memory 1021 into a plurality of unit data items of a predetermined size to be transmitted. Thereafter, CPU 101 successively reads the unit data items obtained by the division from work memory 1021 in the order in which these unit data items are to be externally output from a speaker system 400, and transmits the read unit data items together with a transmission request to communication circuit 200. Therefore, the unit data items obtained by the division are transmitted to network 10 in the above order. It is assumed that the each unit data item obtained by the division has information indicating its place in the order in which the unit data items are to be output.

Communication circuit 200 includes a baseband/MAC (Media Access Control) circuit 250, an RF (Radio Frequency) circuit 205, a balun 204, an antenna 203, EEPROMs (Electrically Erasable and Programmable Read Only Memories) 206 and 207, a power supply circuit 201 and a clock circuit 202.

Clock circuit 202 supplies a clock signal to baseband/MAC circuit 250 and RF circuit 205. Power supply circuit 201 controls supply of an electric power to baseband/MAC circuit 250 and RF circuit 205.

RF circuit 205 performs transmission and reception of data via antenna 203. Balun 204 is arranged between antenna 203 and RF circuit 205.

Baseband/MAC circuit 250 includes a CPU 251, an interface 252, an external bus controller 253, a program memory 254, a shared memory 255, a timer 256 measuring a time, a control MAC unit 257, and an ADC (Analog-Digital Converter) 258 and a DAC (Digital-Analog Converter) 259.

Timer 256 counts the time according to a reference clock signal provided from clock circuit 202, and successively outputs data T1 indicating the counts time.

Shared memory 255 stores a variable C used as a counter, and prestores a table TB. Table TB stores multiple kinds of time data items as well as thresholds corresponding to the respective time data items. The thresholds take different values corresponding to the time data items, respectively. The threshold is compared with a count indicated by variable C. A result of the comparison is referred to for determining whether "frequent sound interruption" to be described later occurred or not. The data in table TB is determined according to a result of an experiment that was performed depending on an environment of network 10 in FIG. 1, and is stored. This environment indicates various conditions relating to communications over network 10 such as ambient noise sources and the like.

Interface 252 is an interface for power amplifier 100. When CPU 251 receives from power amplifier 100 an instruction for transmitting data to network 10, CPU 251 causes interface 252 to take out the data in question stored in a memory (e.g., work memory 1022) in power amplifier 100. Thus, CPU 101 of power amplifier 100 generates audio data to be transmitted, stores this audio data in the above memory and then transmits a transmission request for this audio data to communication circuit 200. The audio data taken out by interface 252 is temporarily stored in program memory 254 as data that forms a "user data body" to be described later of a frame to be transmitted to network 10.

CPU 251 adds various kinds of data including an MAC header and an FCS (Frame Check Sequence) to the data read from program memory 254 to generate the frame for transmission to network 10. CPU 251 stores generated the frame in program memory 254, and stores a flag indicating the generation of the frame in shared memory 255.

Referring to FIG. 3, client device 2*i* is primarily formed of a communication circuit 300 and speaker system 400.

Speaker system 400 includes a CPU 401 for controlling and managing an overall operation of the speaker system, a memory 404 for storing various programs and data, a D/A converter 403 that converts input digital audio data into an analog signal 405 and externally outputs analog signal 405, a decoder 402 and an interface 407 having a function of input/output with respect to communication circuit 300.

Communication circuit 300 has a function and a structure that are substantially the same as those of communication circuit 200 shown in FIG. 2. The portions in communication circuit 300 that are the same as or correspond to those in communication circuit 200 bear the same numbers as those in FIG. 2 except for that the leading "2" is changed into "3". Description thereof is not repeated. A timer 356 successively outputs time data T2 obtained by time count while it is counting the time. Timer 356 performs the time count according to a reference clock signal provided from a clock circuit 302.

A shared memory 355 has a buffer area for temporarily storing the audio data items received via network 10 in the order of reception, i.e., in the order in which these audio data items are received. It is assumed that the audio data item in this buffer area will be deleted (or overwritten with new received audio data item) after it is read from the buffer area.

Figure 4:
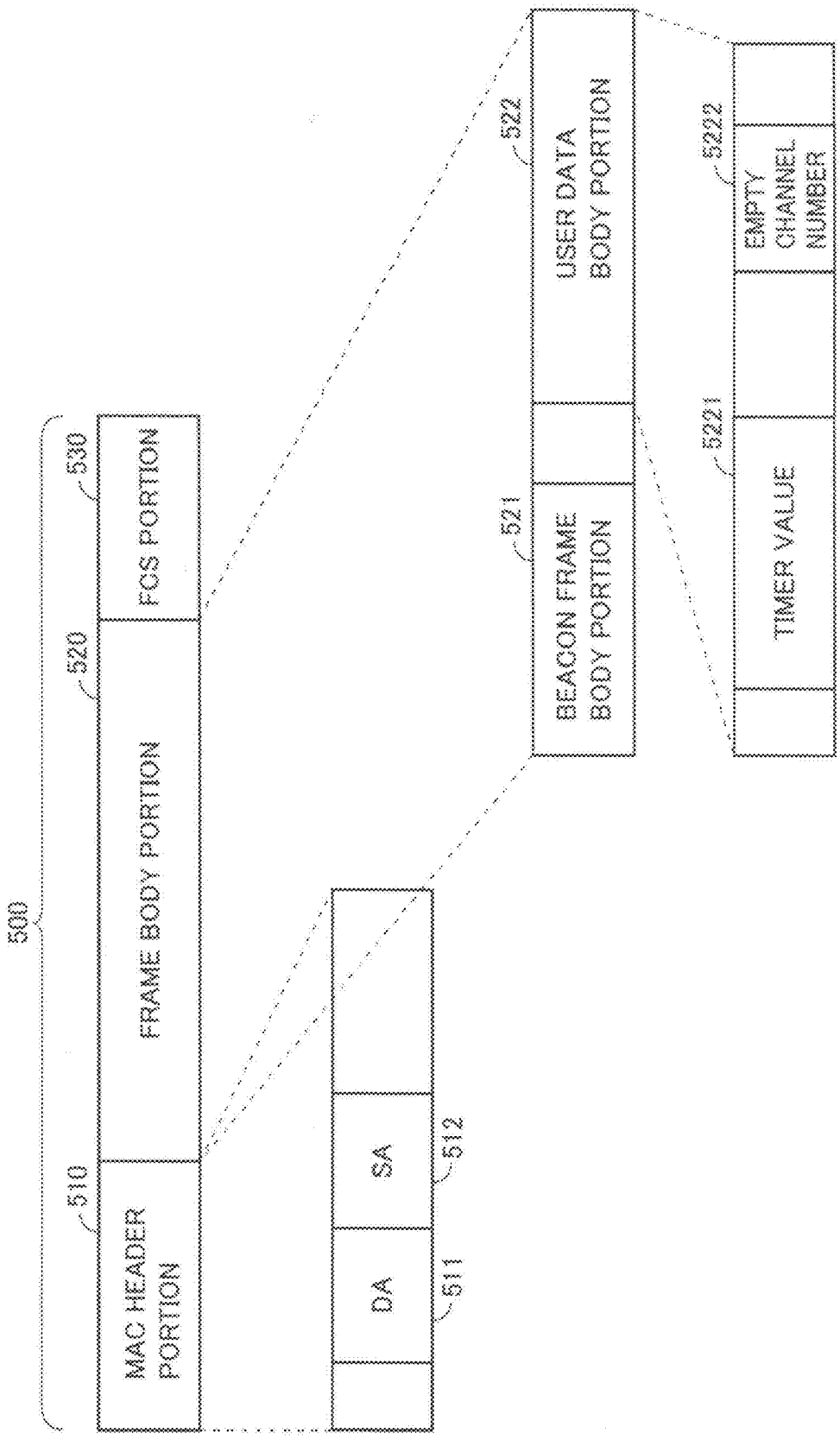
FIG. 4 schematically shows a structure of a frame (Beacon frame) transmitted via a network.

A structure of the Beacon frame that is an example of the frame to be transmitted to network 10 will be described below with reference to FIG. 4. FIG. 4 shows a structure of a frame conforming to the IEEE 802.11 standard.

Referring to FIG. 4, a frame 500 includes a MAC header portion 510, a frame body portion 520 and an FCS portion 530. MAC header portion 510 includes a DA (Destination Address) 511 and an SA (Source Address) 512. DA 511 is a destination address of frame 500. SA 512 is a source address. Each of DA 511 and SA 512 is an MAC address of 6 bytes. EEPROM 206 (or 306) prestores these addresses. MAC header portion 510 also stores network identification information for identifying the ad hoc network as well as identification information for wireless cell, but will not be described below for the sake of simplicity. The identification information of the wireless cell is referred to so that terminals in the same wireless cell can perform the communications.

Frame body portion 520 includes a Beacon frame body portion 521 and a user data body portion 522. User data body portion 522 includes actual data to be transferred. In this embodiment, user data body portion 522 stores a timer value 5221 indicating time data T1 provided from timer 256 of server device 1 and an empty channel number 5222. FCS portion 530 includes information (FCS) used for detection of an error in frame.

Figure 5:
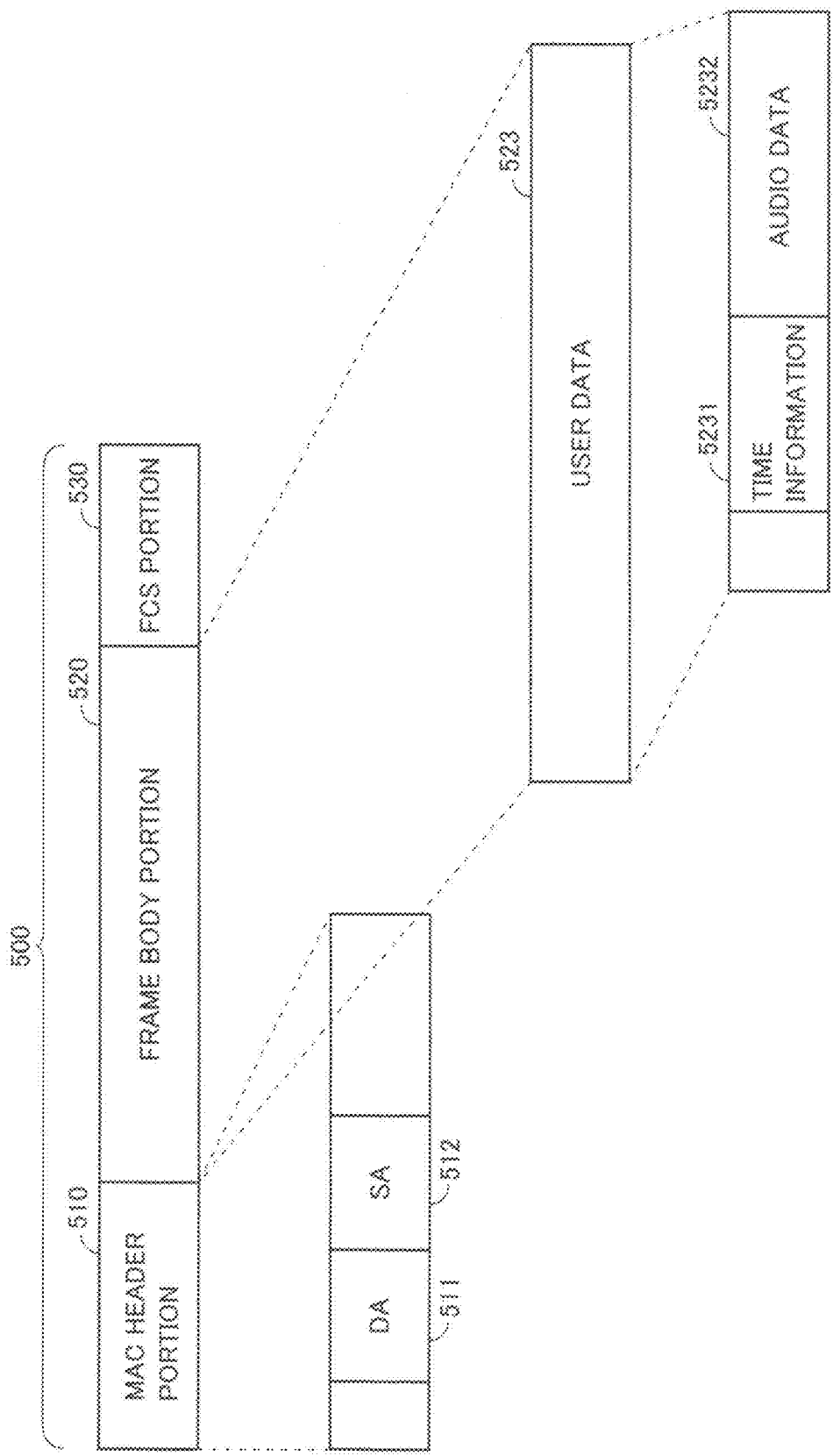
FIG. 5 schematically shows a structure of a frame (data frame) transmitted via the network.

Since frame 500 in FIG. 4 is the Beacon frame, frame body portion 520 includes data about the Beacon frame body and the like. However, when frame 500 is a frame for another purpose, frame body portion 520 contains another appropriate data. FIG. 5 shows a structure in which frame 500 in FIG. 4 is used as a data frame. In this embodiment, the data frame is used for transmitting the audio data from server device 1 to client device 2*i*.

Frame body portion 520 of frame 500 stores user data 523. Stored user data 523 contains time information 5231 and audio data 5232 correlated with each other. Audio data 5232 indicates unit data item that is obtained by division in advance in work memory 1021 as described before. Corresponding time information 5231 bears time data T1 that is output from timer 256 when the unit data item in question is output from power amplifier 100 and is transmitted via communication circuit 200 to network 10. Contents of MAC header portion 510 and FCS portion 530 of the data frame are substantially the same as those in the Beacon frame.

Returning to FIG. 2, control MAC unit 257 reads the frame for transmission stored in program memory 254. When control MAC unit 257 detects the flag stored in shared memory 255, it reads the frame for transmission stored in program memory 254, and transmits the read frame to DAC 259. Thereafter, the frame for the transmission is converted into analog data, and is transmitted to network 10 via RF circuit 205, balun 204 and antenna 203. Thereby, server device 1 transmits the frame in FIG. 4 or 5 to client device 2*i*.

Description will be given on the operation performed by communication circuit 200 when it receives the data transmitted via network 10. The frame transmitted to RF circuit 205 via antenna 203 and balun 204 is transmitted to control MAC unit 257 after it is converted into digital data by ADC 258. Control MAC unit 257 performs processing on the frame converted into the digital signal to detect a top of the frame and to perform time synchronization and frequency synchronization, and then performs error detection, error correction and decoding. Further, control MAC unit 257 determines whether DA 311 of this frame matches an MAC address of communication circuit 200 stored in EEPROM 206 or not. When control MAC unit 257 determines that these match together, it removes MAC header portion 510 and FCS portion 530 from the frame, and transfers residual data (frame body portion 520) to program memory 254. When control MAC unit 257 determines that these do no match together, it abandons the received frame.

When control MAC unit 257 stores received frame body portion 520 in program memory 254, it stores a flag indicating to that effect in shared memory 255. In response to the storage of this flag, CPU 251 processes frame body portion 520 stored in program memory 254. For example, it determines whether "ACK (acknowledgement)" is detected or not. Thereby, server device 1 can receive the frame transmitted from client device 2i.

When client device 2i likewise performs the foregoing operations, client device 2i can transmit the frame generated by itself to server device 1. Also, it can receive the Beacon frame or data frame from server device 1. Particularly, the data of the received data frame is stored in program memory 254 for the error detection processing, and is also stored in the buffer area of shared memory 355 in the same order as the reception.

Figure 6:
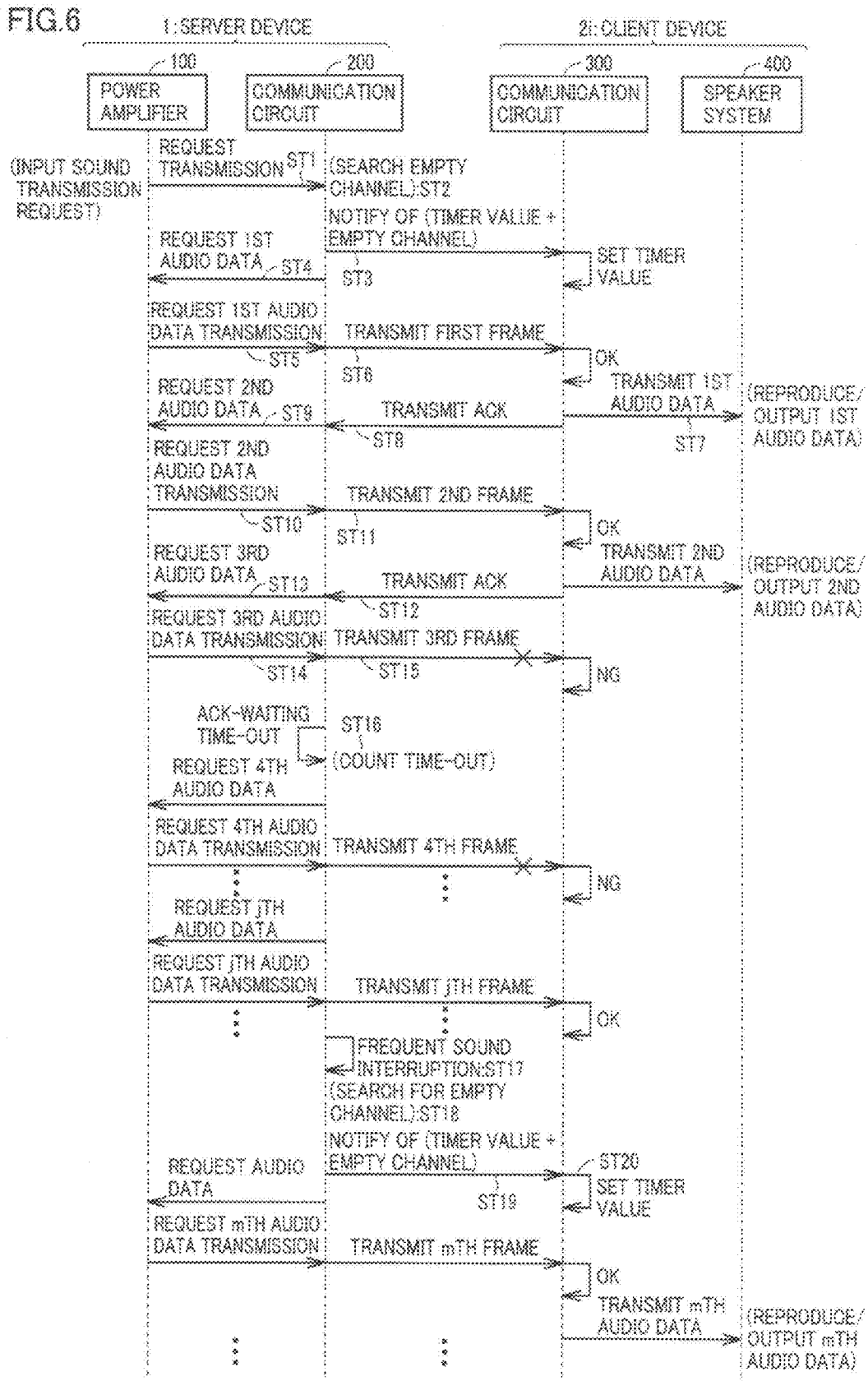
FIG. 6 schematically shows a procedure of audio data communication via the network.

FIG. 6 schematically shows a control procedure relating to the audio data communication between server device 1 and client device 2i according to the embodiment. Referring to FIG. 6, description will be given on the procedure by which server device 1 transmits the audio data to client device 2i, and client device 2i externally outputs the received audio data via speaker system 400.

It is assumed that power amplifier 100 divides in advance the audio data to be transmitted into unit data items, the unit data items obtained by the division are stored in work memory 1021.

When CPU 401 of power amplifier 100 accepts a sound transmission request that is entered by a user through input unit 113, CPU 401 outputs the received transmission request to communication circuit 200 (ST1). When CPU 251 of communication circuit 200 accepts the transmission request from power amplifier 100, it performs processing of searching for an empty channel (ST2).

In the empty channel search processing, the number of received MAC frames per unit time using control MAC unit 257 is detected, and this detection is performed for every channel (frequency band) that is applied for the communications to network 10. Based on a result of this detection, the channel in which the number of received frame(s) is small, i.e., the channel of a relatively low traffic volume (which will be referred to as an "empty channel" hereinafter) is detected. When the empty channel is detected, CPU 251 in communication circuit 200 generates the Beacon frame shown in FIG. 4. A number (frequency information) of the detected empty channel(s) is set as empty channel number 5222 of the generated Beacon frame, and time data T1 indicating the currently measured time provided from timer 256 is set as timer value 5221.

The generated Beacon frame is transmitted to client device 2i, using all the channels (ST3). Thereafter, server device 1 performs the communications using the detected empty channel.

In client device 2i, a program memory 354 temporarily stores the received Beacon frame. A CPU 351 reads timer value 5221 and empty channel number 5222 stored in user data body portion 522 of the Beacon frame in program memory 354, and then performs a setting operation for adjusting the synchronization based on time information between the received audio data and the audio data to be reproduced (to be output).

More specifically, read timer value 5221 is set in time data T2 of timer 356. An antenna 303, a balun 304 and an RF circuit 305 are set to receive the signal in the frequency band indicated by received channel number 5222.

Returning to server device 1, when CPU 251 of communication circuit 200 transmits the Beacon frame notifying of the timer value and the empty channel, it requests the audio data to power amplifier 100 (ST4).

When power amplifier 100 accepts the request for the audio data from communication circuit 200, it reads from work memory 1021 the unit audio data item to be transmitted, and provides the audio data item thus read to communication circuit 200 together with a transmission request (ST5).

In communication circuit 200, CPU 251 generates the data frame in FIG. 5 storing the accepted audio data, using program memory 254. The data frame thus generated stores audio data 5232 indicating the unit audio data item to be transmitted as well as time information 5231 correlated with it. Time data T1 that is currently output from timer 256 is set as time information 5231.

The generated data frame is transmitted toward each client device 2i via network 10 (ST6).

Client device 2i receives the data frame storing the audio data via the channel designated as the empty channel. The received data frames are stored in the buffer area of shared memory 355 in the order of arrival (reception). Further, it is also stored in program memory 354. A control MAC unit 357 performs the error detection on the received data.

CPU 251 reads audio data 5232 of user data 523 stored in the buffer area from the buffer area by a predetermined procedure according to corresponding time information 5231. Details of this predetermined procedure are shown in FIG. 9 to be described later.

The audio data read from the buffer area is provided to speaker system 400 (ST7). Speaker system 400 receives the audio data from communication circuit 300 via interface 407, converts received the audio data into an analog signal by D/A converter 403 and externally outputs converted the audio data. Thereby, a speaker of speaker system 400 outputs a sound based on the received audio data.

When communication circuit 300 detects the completion of the correct reception of the data frame storing the audio data, it generates a management frame storing the ACK indicating the correct reception, and transmits it toward server device 1 (ST8). The management frame has substantially the same structure as the Beacon frame in FIG. 4, but frame body portion 520 stores the "ACK" in place of timer value 5221 and empty channel number 5222.

Returning to server device 1, when server device 1 receives the management frame storing the ACK from client device 2i, communication circuit 200 requests next audio data to power amplifier 100 (ST9). In response to reception of this request, power amplifier 100 reads the audio data to be reproduced next from work memory 1021 together with the transmission request for the next audio data, and provides the read audio data to communication circuit 200 (ST10). Similarly to the foregoing operation, therefore, communication circuit 200 generates the data frame storing the audio data, and transmits it to client device 2i (ST11). Communication circuit 300 of client device 2i provides the received audio data to speaker system 400 so that speaker system 400 reproduces and outputs the received next audio data. In this operation, communication circuit 300 transmits the management frame storing the ACK to server device 1 in response to the completion of correct reception of the audio data (ST12).

When communication circuit 200 in server device 1 receives the management frame storing the ACK from client device 2i, it requests power amplifier 100 to provide the next audio data (ST13). When power amplifier 100 accepts this request, it reads the audio data to be transmitted and reproduced next from work memory 1021, and provides the read audio data to communication circuit 200 together with the audio data transmission request (ST14). When communication circuit 200 accepts the audio data, it generates the data frame in FIG. 5 storing the accepted audio data, and transmits the generated data frame to client device 2i (ST15).

As described above, server device 1 reads the audio data from work memory 1021 in the order in which the audio data is to be output (reproduced) from speaker system 400, and transmits read the audio data to client device 2i.

In reproduction of a series of such audio stream using the data transfer via network 10, when a certain failure occurs in an operating channel and communication circuit 300 cannot complete the correct reception of the audio data, communication circuit 300 does not return the management frame storing the ACK. The failure that may occur on the channel may be due to entry of an obstacle such as a building or a wall that physically intercepts a communication medium (radio wave or infrared ray) of network 10, a noise component emitted from a noise source such as another wireless terminal (e.g., microwave oven) or a noise leaking from a neighboring communication line (not shown).

While the foregoing failure is present in the channel, server device 1 cannot receive the ACK from client device 2i even when it transmits the audio data. Every time communication circuit 200 transmits the data frame storing the audio data, timer 256 will count a time elapsed since the transmission. As a result of this time count, when communication circuit 200 detects from a result of this time count that it has not received the frame of the ACK even after the predetermined period was counted since the transmission of the data frame, communication circuit 200 determines that a time-out occurs, and thereby increments variable C indicating the count of the time-out(s) by one (ST16). Client device 2i determines whether the "sound interruption", i.e., a situation in which the audio data cannot be received and the reproduction (output) thereof is interrupted has occurred frequently or not.

For the determination whether the sound interruption occurred frequently or not, CPU 251 searches table TB based on the time indicated by time data T1. Time data T1 indicates the time elapsed since the start of communications via the channel. And then, CPU 251 reads out from table TB a threshold corresponding to the time data matching the elapsed time, and compares the read threshold with the value of variable C. Thus, when the result of the comparison indicates that the threshold is smaller than the value of variable C, it is determined that the sound interruption has occurred frequently. When the result of the comparison indicates that the threshold is equal to or larger than the value of variable C, it is determined that the sound interruption has not occurred frequently.

When it is determined that the sound interruption has occurred frequently on the predetermined channel that is currently used (ST17), the channels except for this currently used channel are searched for an empty channel for switching the channel to be used to another channel (ST18). Thereby, another channel that is empty and allows the audio data communication is selected, and thereafter the data communications using the selected empty channel will be performed.

When communication circuit 200 of server device 1 determines the new empty channel, it generates a Beacon frame for notifying of the current timer value and the empty channel, and transmits it to each client device 2i (ST19).

In client device 2i, communication circuit 300 receives this Beacon frame, and thereby sets timer value 5221 stored in the received Beacon frame in time data T2 of its own timer 356 (ST20). Thereby, every time the empty channel changes, client device 2i synchronizes the received audio data with the audio data to be output.

After the new empty channel is retrieved and it becomes possible to start the communication using this empty channel, the transmission for next audio data will continue in the substantially same manner.

Figure 7:
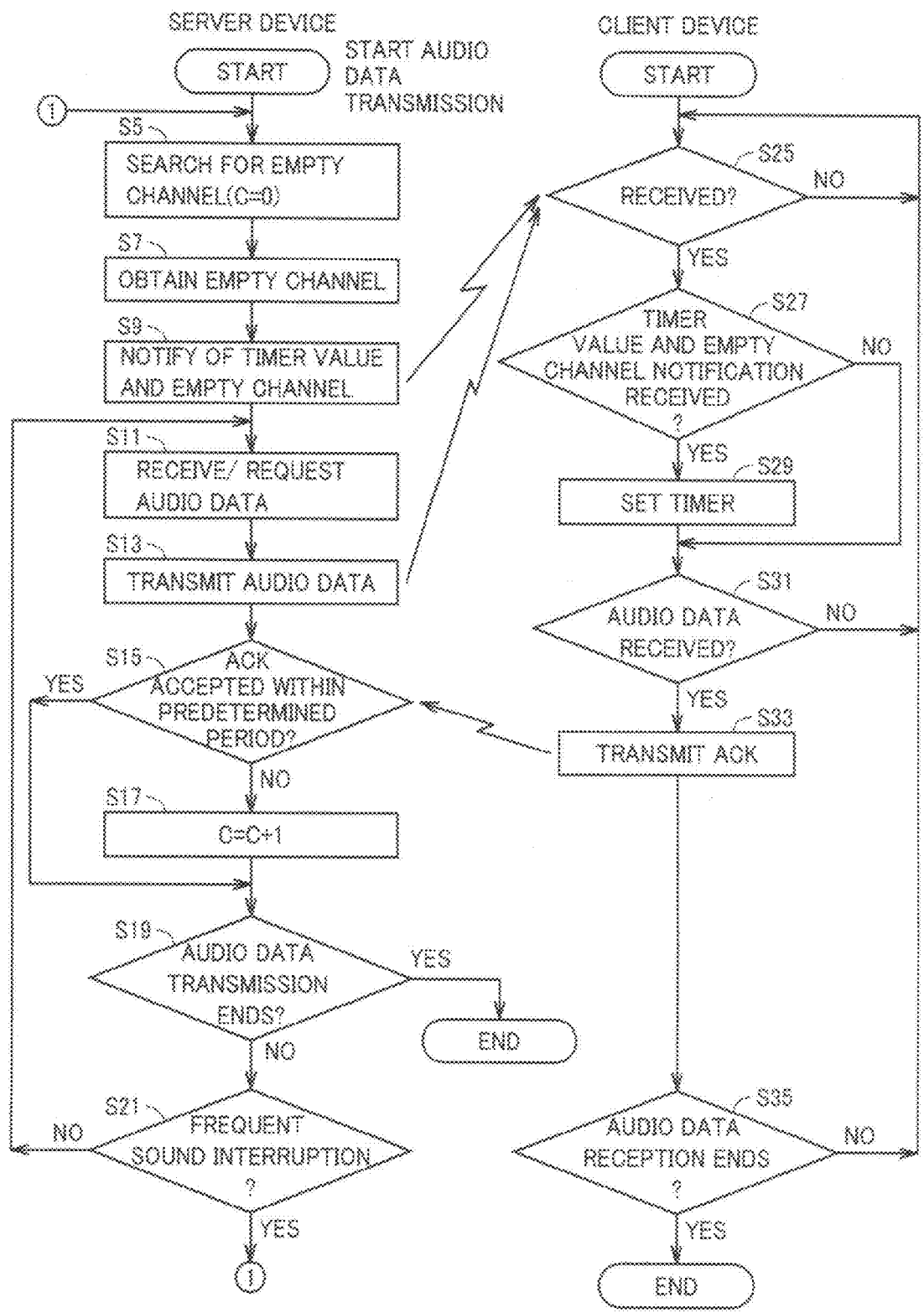
FIG. 7 is a flowchart illustrating a processing of a communication circuit in the audio data communication via the network.
Figure 8:
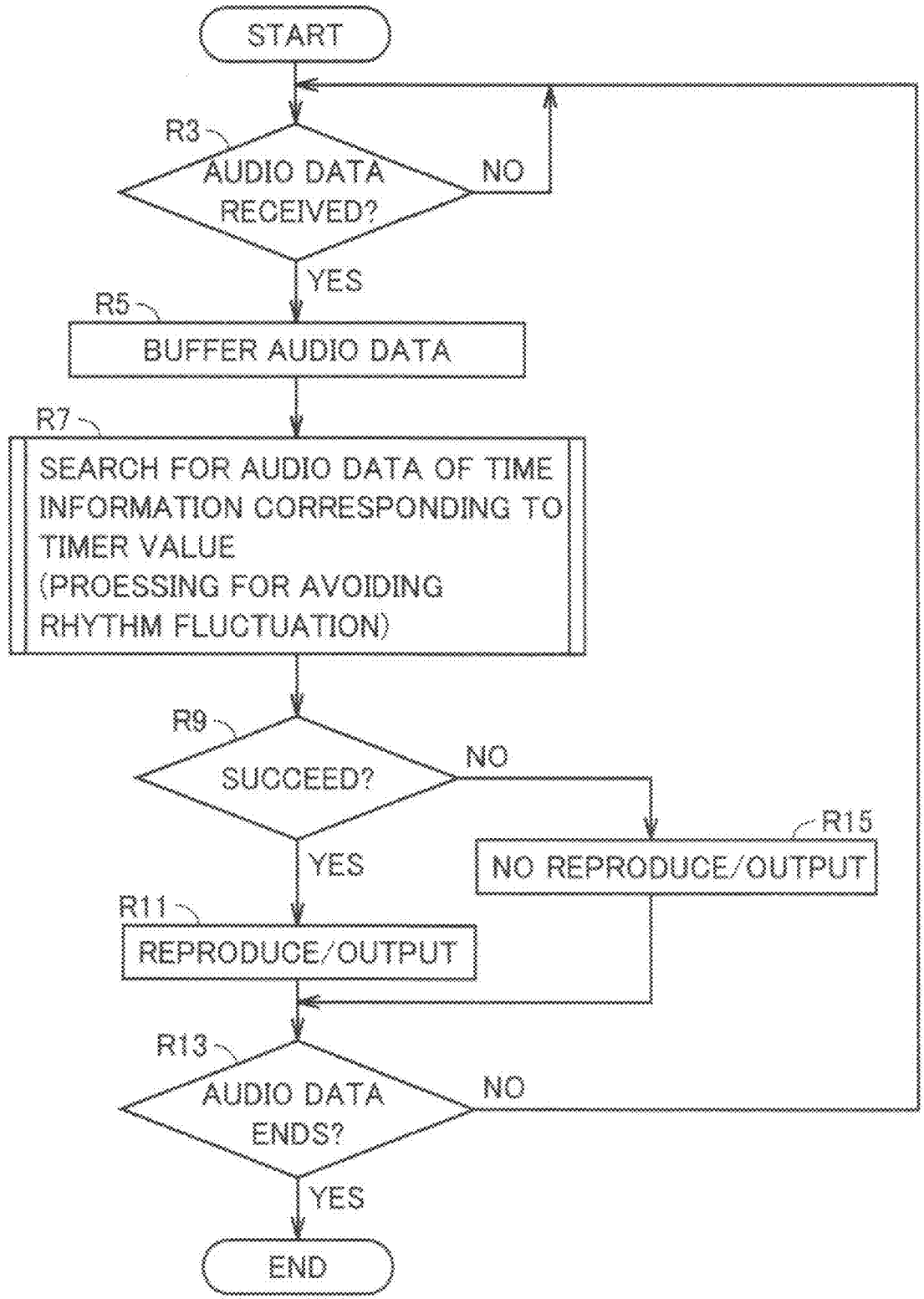
FIG. 8 is a flowchart of processing of a speaker system in the audio data communication via the network.

Referring to FIGS. 7 and 8, description will be given on the communication procedures of communication circuit 200 of server device 1 and communication circuit 300 of client device 2i for the audio stream reproduction shown in FIG. 6. Memory 102 or 404 prestores, as a program, the flowcharts of FIGS. 7 and 8, and CPU 101 or 401 reads the program from memory 102 or 404 to execute operation codes in the read program and thereby implements the processing.

When CPU 251 of communication circuit 200 of server device 1 receives the transmission request for the audio data from power amplifier 100, it starts the processing in FIG. 7.

First, CPU 251 issues a search request for the empty channel to control MAC unit 257. In response to the search request, control MAC unit 257 searches for the empty channel on network 10 (step S5). In this operation, CPU 251 sets variable C of the counter of shared memory 255 to a value of 0 (step S5).

Control MAC unit 257 outputs information about the retrieved empty channel to CPU 251. CPU 251 instructs control MAC unit 257 to transfer the frame via RF circuit 205, balun 204 and antenna 203, using the empty channel indicated by the received information about the empty channel (step S7). Thereby, the frame for the audio data communication is transferred via the detected empty channel.

Subsequently, CPU 251 generates the Beacon frame shown in FIG. 4. Thereby, the Beacon frame shown in FIG. 4 is generated based on the information about the empty channel and time data T1 provided from timer 256. The Beacon frame thus generated is transmitted to network 10 via control MAC unit 257, DAC 259, RF circuit 205, balun 204 and antenna 203. The Beacon frame is transmitted toward all client devices 2i on network 10 via all the channels (step S9). Therefore, all client device 2i can receive the Beacon frame in question.

Subsequently, CPU 251 receives the audio data transmission request and the audio data from power amplifier 100 (step S11). Power amplifier 100 reads the audio data from work memory 1021 in an order in which the audio data is to be reproduced, and is provided to communication circuit 200.

When CPU 251 of communication circuit 200 receives the audio data to be transmitted, it generates the data frame shown in FIG. 5 based on the received audio data and time data T1 provided from timer 256. The generated data frame is transmitted to network 10 (step S13).

Based on time data T1 of timer 256 that is received via external bus controller 253, CPU 251 determines whether it receives the frame of the ACK indicating the correct reception of the transmitted audio data over network 10 before a predetermined period elapses since the transmission of the data frame, or not (step S15).

When the frame of the ACK is not received within the predetermined period (NO in step S15), CPU 251 increments variable C of the counter of shared memory 255 by one via external bus controller 253 (step S17). Then, the process proceeds to a step S19. When the frame of the ACK is received (YES in step S15), the process proceeds to step S19.

In step S19, CPU 251 determines whether the transmission of a series of audio data has ended or not. The determination about the ending of the audio data transmission is performed based on a notification provided from power amplifier 100. When it is determined that the transmission of all the audio data has ended (YES in step S19), the series of processing ends. When it is determined that the transmission has not ended (NO in step S19), the process proceeds to a step S21.

In step S21, CPU 251 determines whether the foregoing "frequent sound interruption" has occurred or not, based on a result of the search of table TB and the count value of variable C.

When it is determined that the "frequent sound interruption" has not occurred (NO in step S21), the process returns to step S11, and the transmission processing for the audio data in and after step S11 will be performed similarly to the foregoing manner.

When it is determined that the "frequent sound interruption" has occurred (YES in step S21), the process returns to step S5 for selecting another channel. In step S5, the channels except for the currently used channel are searched for the empty channel. In the subsequent processing, the transmission of the audio data continues using the retrieved empty channel. Thereby, client device 2*i* is notified of the information indicating the new channel (empty channel), using the Beacon frame in FIG. 4 (step S9). When the notification of the new channel is performed, the Beacon frame in question has stored time data T1 indicating the current time of timer 256. Therefore, client device 2*i* is notified of the information about the empty channel and time data T1. Thereafter, the transmission of the audio data will be performed using this new empty channel.

Meanwhile, communication circuit 300 in client device 2*i* performs the following processing.

First, a baseband MAC circuit 350 determines whether a certain frame is received via RF circuit 305 or not (step S25). While it is not received, a state for waiting for the reception continues. When it is received (YES in step S25), CPU 351 analyzes data in the received frame. Based on an analysis result, it is determined whether the received frame is the Beacon frame in FIG. 4 storing timer value 5221 and channel number 5222 or not (step S27). When it is determined that the received frame is not the Beacon frame (NO in step S27), the process proceeds to a step S31.

When it is detected that the received frame is the Beacon frame (YES in step S27), CPU 351 updates time data T2 of timer 356 with timer value 5221 of the received Beacon frame (step S29), and the process proceeds to step S31. Since time data T2 is updated to indicate received timer value 5221, count of the time of this process proceeding starts from timer value 5221. Updated time data T2 is used for specifying the audio data to be output for audio stream reproduction as shown in FIG. 9 to be described later. Therefore, every time the channel setting is performed, synchronization in time for the audio stream reproduction can be achieved between server device 1 (on the stereo amplifier side) and client device 2*i* (speaker side).

Thereafter, client device 2*i* determines whether it correctly receives the data frame of the audio data in FIG. 5 or not (step S31).

When the audio data is not received correctly (NO in step S31), the processing returns to step S25 without transmitting the frame of ACK, and enters a reception-waiting state.

When the audio data is correctly received, CPU 351 generates the frame of ACK, and returns it to server device 1 (step S33). Thereafter, the audio data receiving processing in and after step S25 will be repeated until the reception of the audio data ends (YES in step S35).

Client device 2*i* detects the ending of reception of the audio data, based on a code that is stored in the data frame and indicates the end of the audio data.

Client device 2*i* transmits the ACK frame when the audio data is correctly received. The determination whether the correct reception is performed of not is made based on a result of error detection that is performed by control MAC unit 357 on the data of the received data frame temporarily stored in program memory 354, using the data in FCS portion 530. When the error detection result indicates no error, it is determined that the correct reception was performed.

When an error is detected based on the error detection result, it is determined that the correct reception was not performed. Based on this determination result, the frame of the audio data is deleted (abandoned) from the buffer areas of program memory 354 and shared memory 355. Therefore, speaker system 400 is supplied with the audio data that is detected as errorless data (normal reception), and only this audio data is externally output from a speaker. When the correct reception was not performed, the series of audio data to be supplied to speaker system 400 was partially lost so that the sound from speaker system 400 interrupts.

In this embodiment, as will be described later, audio data 5232 has a frequency that is imperceptible to the human ears, and the channel to be used during the transmission is appropriately switched for preventing frequent interruption of the sound. Thereby, the output sound of speaker system 400 can be kept to have a certain quality that does not grate on ears. Consequently, it is possible to provide a high-quality sound that is comfortable to the user.

Referring to FIG. 8, description will now be given on the sound output operation via speaker system 400 in client device 2*i*.

First, CPU 351 of communication circuit 300 is always determining whether the data frame of the audio data is received or not (step R3). While the audio data is not received, a state of waiting for the reception continues.

When the data frame of the audio data is received (YES in step R3), CPU 351 buffers the received data frame in a predetermined area of shared memory 355. In this buffering, the data frames are stored in the buffer area successively in the same order as arrival (step R5). The data frames are also stored temporarily in program memory 354 for error detection.

Then, based on time data T2 provided from timer 356, CPU 351 searches this buffer area for the data frame that has audio data 5232 corresponding to time information 5231 indicated by time data T2 (step R7). This searching is accompanied with processing of avoiding rhythm loss to be described later.

When the search in step R7 succeeds, i.e., when the data frame having audio data 5232 that corresponds to time information 5231 indicated by current time data T2 has been stored in the buffer area and can be read therefrom (YES in step R9), audio data 5232 of the data frame thus read is output to speaker system 400. Therefore, the audio data is output externally as a sound via speaker system 400 (step R11).

When the search does not succeed in step R7, i.e., when it is determined that the buffer area has not stored the data frame that has audio data 5232 corresponding to time information 5231 indicated by current time data T2 (NO in step R9), the audio data is not supplied to speaker system 400. Therefore, speaker system 400 temporarily interrupts the output of sound (step R15).

As described above, when communication circuit 300 correctly receives the audio data, and is output from speaker system 400 in the same order as the reception, the speaker continuously outputs the sound. However, when the audio data cannot be received correctly, the output sound interrupts.

Thereafter, the reception of the audio data and the output thereof from the speaker continue until the end of the audio data is detected (YES in step R13).

As described above, after the times of the timers in server device 1 and client device 2i are synchronized using the Beacon frame, the data frame formed of audio data 5232 and time information 5231 added thereto is transmitted via the detected empty channel from server device 1 to client device 2i in a predetermined or required order of output.

Client device 2i successively stores the received data frames in the buffer area in the order of the reception, reads out them for reproduction in the order of the reception, and provides them to the speaker side. In this operation, when the buffer area has not stored audio data 5232 corresponding to time information 5231 indicated by current time data T2 (e.g., when the audio data could not be received correctly due to a channel failure as described before), the sound output from the speaker interrupts.

In this embodiment, each unit item of audio data 5232 transmitted by the data frame has such a frequency that interruption of the sound is imperceptible to the human ears. Therefore, even when the sound interrupts, the interruption does not affect the human sense of hearing unless it occurs frequently.

It has been known that the human sense of hearing is very sensitive to a loss of acoustic rhythm. Accordingly, the processing in step R7 in FIG. 8 includes processing for avoiding the loss of rhythm. This processing is described below with reference to FIG. 9.

FIG. 9 schematically shows a timing chart relating to the reception and reproduction (output from speaker system 400) of audio data 5232 on client device 2i side. In the lowermost portion of FIG. 9, an axis indicated by arrows gives the elapsed time that is indicated by time data T2 provided from timer 356. The elapsed time indicated by this axis is synchronized with time data T1 of timer 256 of server device 1 by timer value 5221 of the Beacon frame.

In the uppermost portion of FIG. 9, the audio data items to be received by client device 2i is indicated in the order of data items D00-D01-D02-D03-D04, i.e., in the order in which the audio data items are to be reproduced (i.e., output) by speaker system 400.

In the next portion below it, the audio data items that client device 2i could actually receive via network 10 are shown in the order of elapsed time.

Referring to FIG. 9, during a period from the start of reception to time XX:00 indicated by time data T2, data item D00 can be actually received corresponding to data item D00 to be received. Therefore, during a time (XX:00-XX:01) indicated by time data T2, speaker system 400 can reproduce data item D00 to be reproduced corresponding to this time.

Next received data item D01 is likewise processed. During the next time (XX:01-XX:02) indicated by time data T2, speaker system 400 can reproduce data item D01 to be reproduced corresponding to this time. During this time period, the next data to be received is data item D02, but client device 2i cannot actually receive data item D02. In this case, it is impossible to retrieve corresponding data item D02 from the buffer area during the next time period (XX:02-XX:03) indicated by time data T2. Therefore, the output of audio data temporarily interrupts (i.e., the interruption of sound occurs) during this time period.

During a time period (XX:02-XX:03), the data to be received is data item D03, which can be actually received. Even if data item D02 to be reproduced during the time period (XX:02-XX:03) is received and stored in the buffer area with a delay during a subsequent time period (XX:03-), time information 5231 of this data item D02 indicates the past time before the time period (XX:03-) in question. Therefore, it is determined that data item D02 is not to be reproduced during the time period indicated by current time data T2, and is deleted (abandoned) from the buffer area. During this time period (XX:03-), data item D03 having time information 5231 corresponding to this time period, i.e., data item D03 to be reproduced in this time period is read from the buffer area, and is reproduced.

If data item D02 were reproduced in this time period (XX:03-) because it can be received, fluctuations in rhythm would clearly occur in output sound, because only data item D03 is to be reproduced during this time period (XX:03-) according to the correct order of the reproduction.

Then, audio data item D04 can likewise be received correctly so that it is possible to reproduce data item D04 which is to be reproduced subsequently to data item D03.

As described above, the interruption of sound occurs in the time period (XX:02-XX:03) in FIG. 9. However, during each time period indicated by time data T2, audio data 5232 corresponding to time information 5231 indicated by the time period in question is reproduced (output) from the speaker. In other words, the speaker reproduces only audio data 5232 in the correct place of the order that is to be reproduced during the time period indicated by time data T2. Therefore, fluctuations can be avoided in rhythm of the sound output from speaker system 400.

Thereby, the sound output from speaker system 400 can keep a certain quality not grate on ears, and the reproduced sound of a high quality can be provided to the user.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A wireless communication system, comprising;
a server device, and
a client device including an audio output unit and performing wireless communication with said server device, wherein
said server device includes:
a first timer counting a present time and outputting first time data indicating a counted time,
an audio data transmitting unit assigning said first time data provided from said first timer to each of unit audio data items obtained by dividing audio data to be transmitted into predetermined units, and continuously transmitting said unit audio data items toward said client device in an order in which said audio data to be transmitted are to be output via said audio output unit, and
a time data transmitting unit transmitting said first time data provided from said first timer to said client device;
said client device further includes:
a storage unit, a second timer starting time count since time of set time data, and outputting second time data indicating a counted time while performing the time count, an audio data receiving unit successively receiving said unit audio data items transmitted continuously from said audio data transmitting unit, and storing received said unit audio data items in said storage unit, a time setting unit receiving said first time data transmitted from said time data transmitting unit, prior to the continuous transmission of said unit audio data items by said audio data transmitting unit, and setting said received first time data in said second timer, and a searching unit searching said unit audio data items stored in said storage unit to retrieve and output successively said unit audio data item having said assigned time data indicating the time indicated by said second time data provided from said second timer; and said unit audio data items successively provided from said searching unit are externally output via said audio output unit.

2. The wireless communication system according to claim 1, wherein said server device and said client device perform wireless communication with each other via a predetermined channel, said client device further includes an acknowledging unit transmitting an acknowledgement to said server device when said audio data receiving unit receives said unit audio data item; and said server device further includes:

an acknowledgement determining unit determining whether said server device receives said acknowledgement in response to transmission of each of said unit audio data items from said audio data transmitting unit or not, and a channel selection determining unit determining whether a different channel is to be selected as said predetermined channel or not, based on a result of the determination about said acknowledgement by said acknowledgement determining unit.

3. The wireless communication system according to claim 2, wherein when said different channel is selected as said predetermined channel based on the determination by said channel selection determining unit, said time data transmitting unit transmits information indicating said different channel and said first time data to said client device, and said client device selects, as the channel to be used for the wireless communication with said server device, said different channel indicated by the information received from said time data transmitting unit.

4. The wireless communication system according to claim 3, wherein said server device further includes a traffic detecting unit detecting traffic of a plurality of channels for the wireless communication, and selects said different channel from among said plurality of channels based on a result of traffic detection by said traffic detecting unit.

5. The wireless communication system according to claim 4, wherein said unit audio data item indicates a sound of a frequency unperceivable to a human hearing sense.

6. The wireless communication system according to claim 5, wherein said wireless communication is communication via an ad hoc communication network.

7. The wireless communication system according to claim 2, wherein said server device further includes a traffic detecting unit detecting traffic of a plurality of channels for the wireless communication, and selects said different channel from among said plurality of channels based on a result of traffic detection by said traffic detecting unit.

8. The wireless communication system according to claim 1, wherein when said different channel is selected as said predetermined channel based on the determination by said channel selection determining unit, said time data transmitting unit transmits information indicating said different channel and said first time data to said client device, and said client device selects, as the channel to be used for the wireless communication with said server device, said different channel indicated by the information received from said time data transmitting unit.

9. The wireless communication system according to claim 8, wherein said server device further includes a traffic detecting unit detecting traffic of a plurality of channels for the wireless communication, and selects said different channel from among said plurality of channels based on a result of traffic detection by said traffic detecting unit.

10. The wireless communication system according to claim 1, wherein said unit audio data item indicates a sound of a frequency unperceivable to a human hearing sense.

11. The wireless communication system according to claim 1, wherein said wireless communication is communication via an ad hoc communication network.

* * * * *